United States Patent [19]
Deeg et al.

[11] 3,880,634

[45] Apr. 29, 1975

[54] METHOD AND APPARATUS FOR PRODUCING TUBING FROM SHORT GLASSES

[75] Inventors: Emil W. Deeg, Woodstock, Conn.; David A. Krohn, Southbridge; Leslie B. Martel, Sturbridge, both of Mass.

[73] Assignee: American Optical Corporation, Southridge, Mass.

[22] Filed: Apr. 24, 1974

[21] Appl. No.: 463,489

[52] U.S. Cl. .......................... 65/73; 65/81; 65/124; 65/214
[51] Int. Cl. .......................... C03b 15/14
[58] Field of Search ......... 65/73, 81, 124, 213, 214, 65/191

[56] References Cited
UNITED STATES PATENTS

| | | |
|---|---|---|
| 759,742 | 5/1904 | Owens .................................. 65/73 |
| 2,019,046 | 10/1935 | Delpech ................................. 65/73 |
| 2,078,919 | 4/1937 | Bates ..................................... 65/73 |
| 2,226,504 | 12/1940 | Rowe ..................................... 65/73 |

*Primary Examiner*—Arthur D. Kellogg
*Attorney, Agent, or Firm*—William C. Nealon; H. R. Berkenstock, Jr.

[57] ABSTRACT

Tubing of short glass is provided by casting the glass in a tubular mold under a vacuum. The basic principle of operation is similar to that utilized in the Torricelli barometer. That is, pressure on the surface of the melt forces the molten glass into a tubular mold to a height determined by the difference in pressure between the ambient over the surface of the melt and that remaining in the mold.

15 Claims, 2 Drawing Figures

METHOD AND APPARATUS FOR PRODUCING TUBING FROM SHORT GLASSES

BACKGROUND OF THE INVENTION

This invention is related to the production of glass tubing and is more particularly concerned with novel method and apparatus for producing glass tubing from short glasses.

Many manufacturing techniques are known and used commercially for the production of glass tubing. The most widely used of these processes comprises the drawing of a continuous stream of glass from a melt at a viscosity of approximately $10^4$ poises. One such process is known as the "Danner Process" and comprises the stream of glass being wound around a hollow ceramic core and being drawn off the core in a tubular form by maintaining a slight overpressure inside the ceramic core. The use of this process is generally limited to glass tubing of approximately 5 centimeters in diameter or less. Glass tubing of a larger diameter is generally drawn directly from the molten glass either through an orifice in the bottom of the container or from the surface of the melt. The orifice in the bottom of the container is usually made from a high temperature refractory material or of a metal, generally platinum. Above the orifice inside the glass melt a nozzle formed of a refractory material is positioned. The orifice of the nozzle provides a slight overpressure thus producing the hollow core of the tubing. A similar process allows the tubing to be drawn upwards from the surface of the glass melt. Here again, a nozzle configuration is utilized.

All of the foregoing processes are limited to glasses of the so-called "long" glass type. What is meant by long glasses is not precisely defined in the literature. It appears to be more of a term of art. However, at least for the purposes of the present context, a long glass is defined as one having a temperature differential between the flow point and the softening point of greater than 550°C. The flow point is herein defined to be the temperature at which the viscosity in poises equals $10^2$. The softening point is defined as that temperature at which the viscosity of the glass equals $10^{7.5}$ poises. Therefore, those glasses in which the temperature differential between the flow point and the softening point is equal to or less than 550°C are termed "short" glasses.

All of the foregoing prior art processes for producing commercial amounts of glass tubing are limited to the long glasses. It is impossible with these processes to produce glass tubing of so-called short glasses which are required in many optical systems, for example, fiber optics. In addition, various phosphate base glasses which are resistant to flourine attack are short glasses. At present, when tubing is required from such short glasses, it is produced by either casting a large block of glass and core drilling the tube out of the block of glass, or by casting the glass in metal molds of a limited size. Obviously, a number of disadvantages adhere to either or both of these methods of producing tubing from short glasses. In the core drilling method, a very high amount of waste is required in order to produce a usable piece of glass tubing, also this process is necessarily limited in the length of the tubing which may be produced by the size of a block of glass which may be cast in a single operation. Additionally, a very low yield occurs with such a process due to breakage. Furthermore, such a process is extremely expensive and slow. The casting process while less expensive has two principal disadvantages, one being the size limitation since it is difficult to maintain the glass in a molten state sufficiently long to fill a sizable mold without having portions of the glass tube rigidify well ahead of other portions thereby setting up stress patterns and inhomogeneities which deleteriously affect the quality of the tubing. The other major disadvantage to the casting process is that bubbles are often included within the cast melt since air is trapped during the casting process and cannot be fined additionally after the melt is placed in the mold.

SUMMARY OF THE INVENTION

Accordingly, it is an object of the present invention to provide novel method and apparatus for producing glass tubing from short glass melts.

Another object is to provide such a method and apparatus which are able to produce quality glass tubing from short glasses quickly and economically.

Briefly, the invention in its broadest aspect comprises method and apparatus for producing glass tubing from a melt of a glass having a temperature differential between the flow point and softening point of less than about 550°C. The method comprises the steps of and the apparatus comprises the elements for placing a mold in contact with a surface of the glass melt. The mold comprises a cylindrical shell surrounding a central core, defining a cylindrical space therebetween, and extending in a longitudinal direction. The core has a coefficient of thermal expansion greater than the coefficient of thermal expansion of the glass melt. The shell includes means for rendering the effective coefficient of thermal expansion of the shell less than the coefficient of thermal expansion of the glass melt. A vacuum is drawn within the cylindrical space between the mold core and shell for a time sufficient to allow ambient pressure on the upper surface of the glass melt to force the molten glass into the mold to a predetermined height. The mold and the contained glass are then cooled so that the glass may solidify into a tubular section. Finally, the mold is separated from the tube of glass.

Further objects, advantages, and features of the invention will be apparent in the arrangement and construction of the constituent parts, in detail, as set forth in the following specification taken together with the accompanying drawing.

DETAILED DESCRIPTION OF THE PREFERRED EMBODIMENTS

Figure 1:
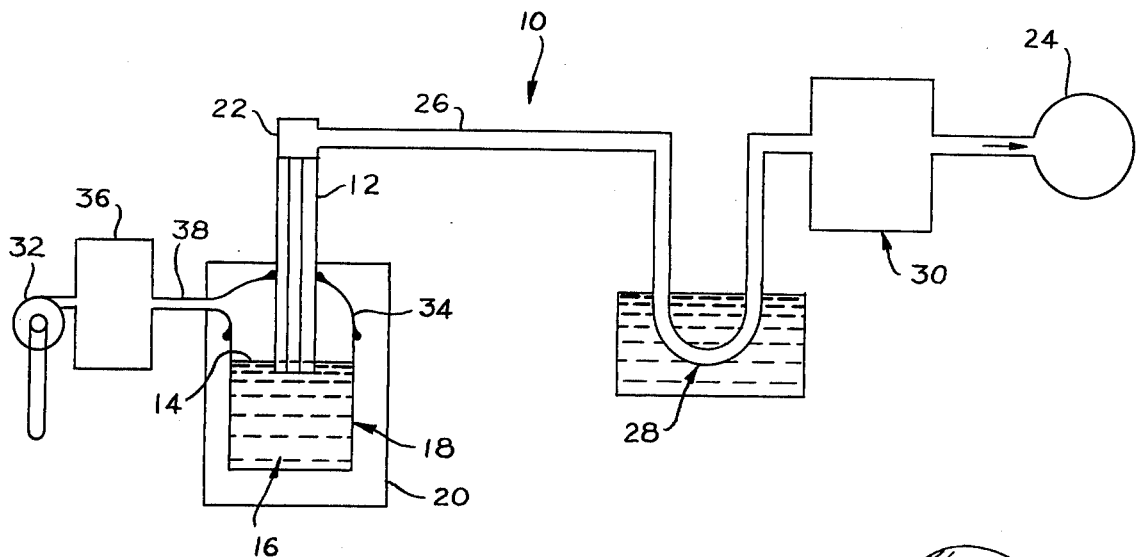
FIG. 1 is a schematic representation of an apparatus according to the present invention for casting tubing from short glasses.

Referring initially to FIG. 1, there is shown an apparatus 10 for producing glass tubing from short glasses. A tube mold 12 is in contact with the upper surface 14 of a molten glass melt 16. The glass melt 16 is contained in a crucible 18 which is generally formed of standard crucible materials, such as platinum or ceramic refractories, depending upon the glass composition. The crucible and contained molten glass are within a standard glass making furnace 20 such as a furnace heated by silicon carbide resistance elements. The crucible 18 and furnace 20 form merely one exemplary means for containing and melting the glass. In high volume production, the entire function would most likely be performed by a continuous production tank.

Attached to the upper end of the tube mold 12 is a holding and vacuum application cap 22. The cap 22 is connected to a vacuum pump 24 through a line 26, a gas trap 28, and a vacuum reservoir 30. The vacuum apparatus is utilized to lower the ambient pressure on the surface 14 of the molten glass contained within the tube mold 12. Therefore, because a difference in ambient pressure is achieved between the areas of the surface 14 under the tube mold 12 as compared with the other portions of the surface 14, the molten glass is forced into the tube mold.

The basic physical principle of casting the glass into the tube mold 12 under vacuum is similar to the Torricelli barometer. The theoretical height, $h$, to which the molten glass can be drawn in the mold is given by the following expression: $h = P_0/(d \times g)$ where $P_0$ is the ambient pressure over the majority of the surface of the melt 14, $d$ is the density of the glass, and $g$ is the standard gravitation constant. For a pressure of one standard atmosphere and a glass density of 2.6 gm/cm$^3$, the glass can reach a height of 413 cm.

Obviously, many factors can influence the actual height to which the glass may be forced within the tube mold. For example, the actual level of vacuum drawn within the tube mold 12 due to leakages throughout the system and practical economic limits severely effects the level. Also, the higher the glass is raised in the tube mold, the slower the flow becomes, assuming that the temperature of the glass remains constant. However, as is obvious, unless the entire tube mold is contained within the glass melting furnace, it is unlikely that the glass will not cool during the traversal of the tube mold thereby becoming more viscous and rising more slowly. Therefore, time and temperature each serve to influence the actual attainable height of the glass within the tube mold.

Three approaches may be taken within the purview of the invention to help alleviate the aforementioned limitations. These approaches may be taken either in conjunction with one another or alternatively depending upon the particular application. Firstly, the tube mold per se may be supplied with heating means such as embedded electrical heaters in order to maintain the temperature of the mold sufficiently high to prevent the glass temperature from dropping to a level at which the glass becomes too viscous to rise within the tube mold 12. Also, if the materials of the tube mold are electrically conductive, a potential could be imposed directly across the tube mold to cause heating thereof.

Secondly, the pressure differential which exists between the interior of the tube mold 12 and the outer surface 14 of the melt can be increased by application of gas pressure above that of atmosphere, i.e., superatmospheric, to cause the glass to flow more quickly into the tube mold 12 and to rise more quickly to the desired height. Similarly, the rate of application of the superatmospheric pressure may be varied to compensate for diminishing flow rates in the tube mold at different glass heights. The application of the superatmospheric pressure is accomplished in the exemplary embodiment of FIG. 1 by the apparatus shown schematically therein which includes a compressor 32 connected to a hood 34 sealed over the crucible 18 through a pressure reservoir 36 and a duct line 38. Alternatively, the entire interior of the furnace 20 could also be pressurized to accomplish the increased pressure differential desired. The only limitation which is applicable to the application of the superatmospheric pressure to the upper surface of the melt 16 is that the flow of glass into and within the tube mold 12 should be laminar. If the flow becomes turbulent, residual gas contained within the tube mold may be entrapped within the entering glass and bubbles may be formed in the resulting tubing. If the flow remains laminar, however, the likelihood of entrapping gas is severely diminished and bubble-free tubing may be expected.

Thirdly, it has been found that the tube mold 12 can be oriented either vertically, i.e., perpendicular to the upper melt surface 14, or at an inclined angle with respect to the melt surface. If the tube is to be drawn from a narrow crucible, it has been found that a vertical orientation of the mold is preferable. However, in those applications wherein a wide mouth crucible or glass tank is utilized, advantage adheres to the inclination of the tube mold 12 with respect to the melt surface 14 since the greater the angle of departure from the vertical, the greater the length of tubing which may be produced in the tube mold 12 without the additional application of pressure to the melt surface. When discussing the orientation of the tube mold 12, reference is made to the orientation of the longitudinal direction along which the mold is extended.

Figure 2:
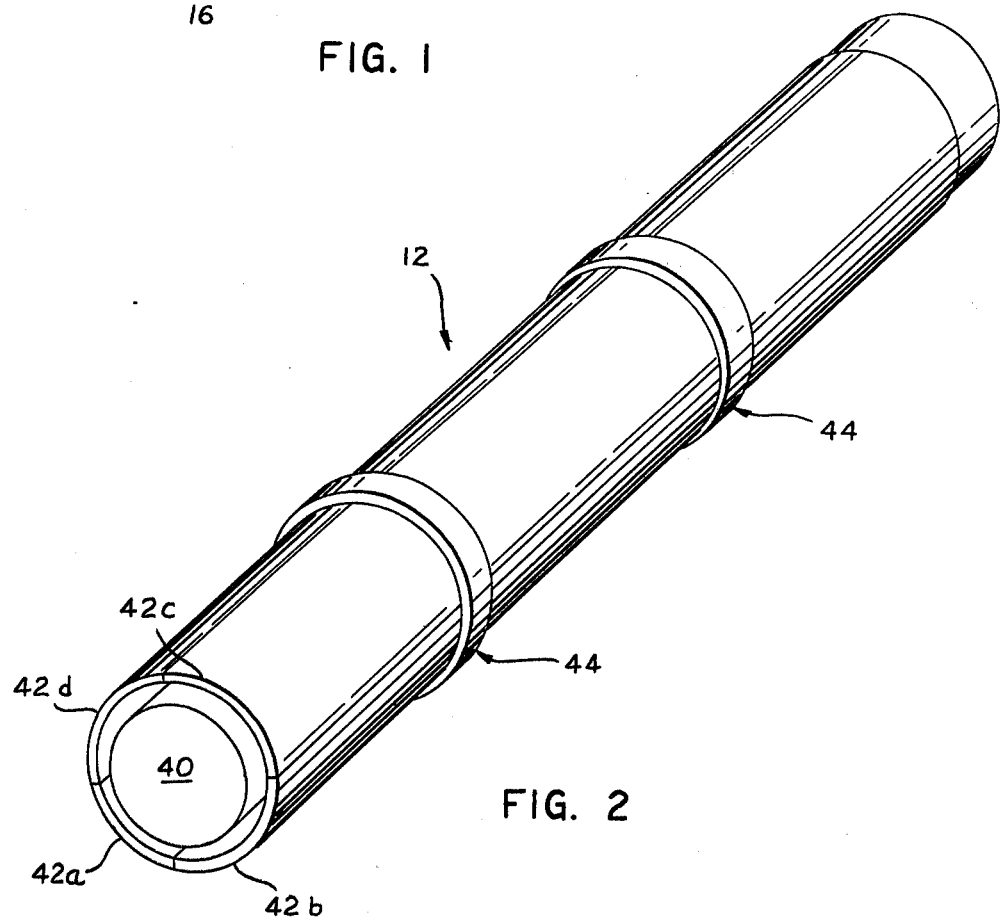
FIG. 2 is an enlarged, oblique view of a preferred type of mold utilizable in the apparatus of FIG. 1.

Referring now to FIG. 2 of the drawing, there is shown a preferred construction for the tube mold 12. Generally, the tube mold 12 is comprised of a core 40 and a shell 42. The shell and the core must have different effective coefficients of thermal expansion such that the shell 42 contracts less than the glass cast in the mold and the core 40 contracts more than the glass. In other words, when the mold is constructed with a solid cylindrical shell and a solid rod formed core, wholly different materials are required for the shell and the core and the choice is dependent upon the particular glass to be used in the melt. This solid construction is also included within the purview of the invention. However, it puts a limitation on the materials which may be utilized, particularly those for the shell. Therefore, the design shown in FIG. 2 of the drawing is preferred. In this construction, the shell is formed of a plurality, in this case four, of cylindrical segments 42$a$, 42$b$, 42$c$, and 42$d$. The various segments are divided from the cylindrical shell along a plurality of parallel straight dividing lines. In this construction, it is no longer required that the shell material have a coefficient of thermal expansion lower than that of the glass. It is now possible for the individual sections of the shell to contract during the cooling process and form spaces between the adjacent sections without pinching and putting undue prssure on the soldifying glass. In order for this construction to be operative, however, some means, such as elastic bands 44, must be associated with the cylindrical segments to urge the plurality of segments towards the core. The following materials have been found to be useful for forming mold shell and core sections. The shell is formed of No. 304 stainless steel and the core of a cast iron.

The following table sets forth in weight percent, specific exemplary glasses which can be formed into tubing according to the present invention:

| Example | A | B | C | D | E | F | G |
|---|---|---|---|---|---|---|---|
| $SiO_2$ | 57.0 | 21.46 | — | 21.00 | — | — | — |
| $Na_2O$ | 1.0 | 1.30 | — | 1.18 | — | — | — |
| $K_2O$ | — | 1.95 | — | 1.76 | — | — | — |
| $CaO$ | 5.5 | — | — | — | 9.5 | — | — |
| $MgO$ | 12.0 | — | — | — | — | — | — |
| $BaO$ | — | 30.55 | 8.9 | 27.56 | 28.5 | — | — |
| $B_2O_3$ | 4.0 | — | 24.5 | — | 47.5 | — | — |
| $Al_2O_3$ | 29.5 | — | — | — | 9.5 | 16.4 | 19.60 |
| $La_2O_3$ | — | 23.26 | 36.9 | 21.00 | — | — | — |
| $Ta_2O_5$ | — | 11.48 | — | 10.36 | — | — | — |
| $Nb_2O_5$ | — | 10.00 | 13.9 | 9.02 | — | — | — |
| $WO_3$ | — | — | 7.0 | 4.75 | — | — | — |
| $TiO_2$ | — | — | — | 5.00 | — | — | — |
| $ZrO_2$ | — | — | 8.9 | — | — | — | — |
| $Y_2O_3$ | — | — | — | — | 5.0 | — | — |
| $P_2O_5$ | — | — | — | — | — | 15.0 | 3.93 |
| $ZnO$ | — | — | — | — | — | 68.6 | 73.35 |
| $FeO$ | — | — | — | — | — | — | 3.12 |

While there have been shown and described what are considered to be the preferred embodiments of the present invention, it will be obvious to those skilled in the art that various changes and modifications may be made therein, for example, by altering the shape of either the shell or the core of the tube mold so as to form tubing of a variety of configurations, such as oval, square, rectangular, or hexagonal, without departing from the invention as defined in the appended claims.

We claim:

1. A method for producing glass tubing from a melt of a glass having a temperature differential between the flow point and the softening point of less than about 550°C, the method comprising the steps of placing a mold in contact with a surface of the glass melt, the mold comprising a cylindrical shell surrounding a central core, defining a cylindrical space therebetween, and extending in a longitudinal direction, substantially all of the cylindrical space being above the upper surface of the melt, the core having a coefficient of thermal expansion greater than the coefficient of thermal expansion of the glass melt, and means for rendering the effective coefficient of thermal expansion of the shell less than the coefficient of thermal expansion of the glass melt, drawing a vacuum within the cylindrical space for a time sufficient to allow ambient pressure on the upper surface of the glass melt to force the molten glass into the mold to a predetermined height, cooling the mold and contained glass to solidify the glass into a tube, and separating the mold from the tube of glass.

2. A method according to claim 1, wherein the longitudinal direction is generally vertical.

3. A method according to claim 1, further including the step of applying superatmospheric pressure to the upper surface of the melt to aid in forcing the molten glass into the mold.

4. A method according to claim 1, further including the step of heating the mold to keep the glass in a fluid state until the predetermined height in the mold is attained.

5. A method according to claim 3, wherein the additional step of applying pressure to the upper surface provides laminar flow of the molten glass.

6. Apparatus for producing glass tubing from a melt of a glass having a temperature differential between the flow point and the softening point of less than about 550°C, the apparatus comprising means for containing and melting the glass, a mold positioned in contact with a surface of the glass melt, the mold including a cylindrical shell and a core centrally disposed in the shell and coextending along a longitudinal direction, and defining a cylindrical space therebetween, the core having a coefficient of thermal expansion greater than the coefficient of thermal expansion of the glass, and means for rendering the effective coefficient of thermal expansion of the shell less than that of the glass, and means for drawing a vacuum within the cylindrical space between the mold core and shell thereby allowing ambient pressure on the upper surface of the glass melt to force the molten glass from the crucible into the mold to a predetermined height.

7. Apparatus according to claim 6, wherein the longitudinal direction is generally vertical.

8. Apparatus according to claim 6, wherein the mold shell is a hollow cylinder having a coefficient of thermal expansion less than the coefficient of thermal expansion of the glass.

9. Apparatus according to claim 8, wherein the shell is formed of a 304 stainless steel and the core is formed of a cast iron.

10. Apparatus according to claim 6, wherein the shell comprises a plurality of cylindrical segments, the cylindrical segments being divided along a like plurality of parallel, straight lines, and means for urging the plurality of segments toward the core.

11. Apparatus according to claim 6, wherein there is further included means for applying superatmospheric pressure on the upper surface of the melt, the superatmospheric pressure being limited by the ability to maintain laminar flow of the glass.

12. Apparatus according to claim 11, wherein the means for containing and melting the glass includes a crucible for containing the melt and a furnace for heating the crucible to a temperature sufficient to maintain the melt in a liquid state, and wherein the means for applying superatmospheric pressure includes means for sealing at least that portion of the furnace above the surface and a source of compressed gas connected to the portion of the furnace for raising the pressure in the portion of the furnace.

13. Apparatus according to claim 12, wherein the means for sealing includes a hood emplaced over the further included means for maintaining the glass in a crucible and surrounding the mold shell, the hood being connected to the source of compressed gas through a duct and a pressure reservoir.

14. Apparatus according to claim 6, wherein there is fluid state until the predetermined height of glass in the mold is attained.

15. Apparatus according to claim 14, wherein the means for maintaining the glass comprises means for electrical heating a mold element.

* * * * *